(No Model.)
W. A. PITT.
MEANS AND APPARATUS FOR COLLECTING AND SEPARATING SEWAGE.
No. 382,188. Patented May 1, 1888.
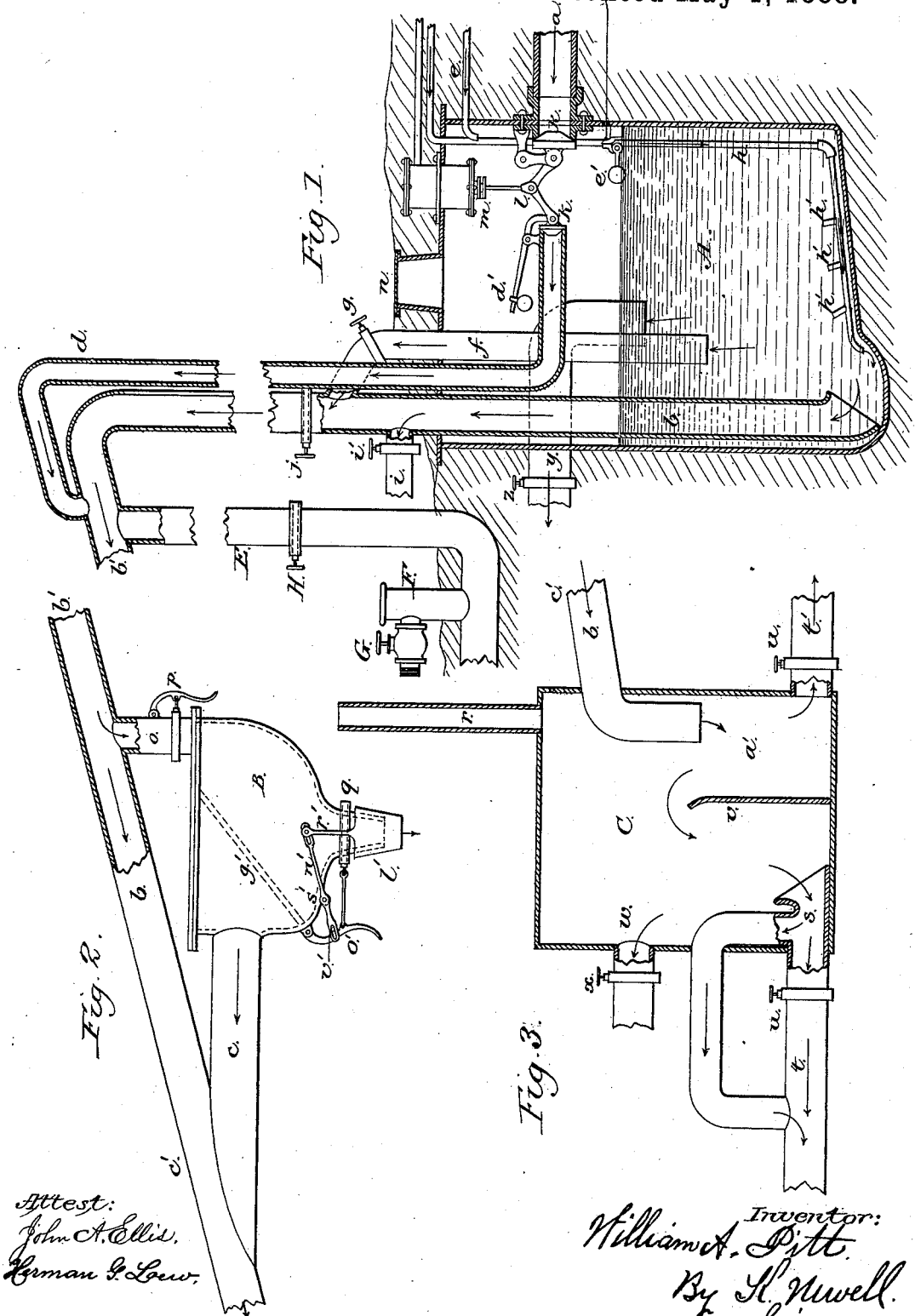

United States Patent Office.

WILLIAM A. PITT, OF GLENBROOK, CONNECTICUT.

MEANS AND APPARATUS FOR COLLECTING AND SEPARATING SEWAGE.

SPECIFICATION forming part of Letters Patent No. 382,188, dated May 1, 1888.

Application filed July 26, 1884. Serial No. 138,915. (No model.)

*To all whom it may concern:*

Be it known that I, WILLIAM A. PITT, a citizen of the United States, residing at Glenbrook, in the county of Fairfield and State of Connecticut, have invented certain new and useful Improvements in Means and Apparatus for Collecting, Separating, and Disposing of Sewage, of which the following is a specification.

My invention relates to certain improvements in means and apparatus for the collection and disposal of sewage from cities and towns; and the main object of my improvement is to provide a means of sewerage for low plains and flat undulating districts, where the gravitating system is impracticable, or is attended with great objections to the inhabitants thereof. To attain this object my system consists, first, in collecting the sewage in a closed receptacle connecting with the ordinary grade-sewer, then agitating the mass by the introduction of jets of compressed air, and forcing the same at an elevation into another tank by the action of the air; second, in combining with the same an apparatus for collecting and separating the fluid from the solid matter; third, in the employment of an auxiliary separator for the collection of matter the specific gravity of which is less than the fluid; and, finally, in the combination and arrangement of apparatus for carrying out the sewerage system, all as will be fully hereinafter set forth.

The invention is clearly represented in the accompanying drawings, in which—

Figures 1, 2, and 3 show the several tanks and their connections with each other and the sewer-connection in a part section and part elevation.

A represents a closed tank for receiving the sewage, which is placed beneath the ground and communicates with the ordinary grade-sewer pipe, $a$, so that the matter to be discharged will by its natural head gravitate into and fill such tank.

B and C are smaller receptacles, the former, B, communicating with the main tank or receptacle A by means of the elevated pipe $b$, and the latter, C, connected to the tank B by the same pipe, the reference-letters $b'$ and $c'$ indicating, respectively, the plane of each connecting portion of pipe.

The main outlet or discharge pipe $b$ extends from the bottom of the interior of the tank A to a height above suitable to obtain the requisite elevation for a gravity flow to any point of final discharge of the sewage. From the interior of the tank rises an air-relief pipe, $d$, which terminates in the main pipe $b$.

$e$ is a pipe opening into the top of the tank A for supplying compressed air from an air-compressing engine or a receiver stationed at any point remote from the tank. A vertical pipe, $f$, extends from the interior of the tank, about midway thereof, to above its top and communicates with the main pipe $b$. Through this pipe the fluid and lighter matters may be discharged from the top portion of the tank into the main pipe $b$ at a point above the tank, from which point they pass on to the tank B. A gate-valve, $g$, controls the flow in the pipe $f$.

$h$ represents a pipe provided with short branches $h'$ (or in place thereof with suitable perforations) for conveying air to the bottom of the tank for the purpose of agitating or ebullitionizing the matter contained therein when it is desired to discharge it in an entire unseparated mass.

Connecting with the main pipe $b$ is a horizontal pipe, $i$, having gate-valve $i'$ for permitting the discharge from the main pipe of the ascending matter at this point, if desired.

$j$ is a gate-valve in the main pipe for closing communication with the tank B. The mouth of the sewer-pipe $a$ and air-relief pipe $d$ is closed by means of caps $k$, connected together by pivoted arms $l$, which are operated by a piston, $m$, controlled by any suitable power at any remote point. The opening of the said pipes may be effected by weighted levers $d'$, or by a counter-pressure on the piston.

A man-hole, $n$, is provided in the top of the tank A. The main outlet-pipe $b$ communicates with the receptacle B by a short vertical pipe, $o$, which opens in the top thereof and is provided with a gate-valve, $p$. The tank B is designed as a means for separating the sewage mass that is passed over from the tank A. The use of this tank is, however, discretionary, as such sewage matter may be conveyed directly through the pipe $b$ into the tank C. In the bottom of the tank B is provided a funnel-shaped opening, which is closed by a valve, $q$, controlled from the outside. By opening this valve the matter accumulated at the bottom of the tank may be emptied into any suitable vessel or cart for transportation or for use.

$g'$ is a grating extending diagonally across the tank, which serves the purpose of a sieve to separate the sewage. The heavier matter is held in suspension in the tank B, while the lighter matter flows out by pipe $c$ and on through the main pipe $b$ into the third tank, C. If preferred, however, communication with the latter tank may be cut off, in which case the matter will gravitate through pipe $b$ to its final destination. The third tank, C, is closed and its lower part is divided into two compartments by the diaphragm $v$.

$r$ is an air-relief pipe.

$s$ is an outlet-pipe, having a bell-shaped mouth opening on the bottom of the interior of the tank. The inlet-pipe $b$ extends into the tank and is bent downward, so that it opens into the compartment $a'$.

$t\ t'$ are discharge-pipes opening into the bottom of the tank on opposite sides thereof, which are provided with gate-valves $u\ u$. Through these pipes any matter settling at the bottom of the tank may be drawn out and the cleansing of the tank be effected when required.

By closing the valve $p$ in the pipe $o$ communication with the tank B will be cut off and the sewage matter expelled from the tank A will flow directly into the tank C. The outlet-pipe $s$ extends upward and is bent to communicate with the horizontal outlet-pipe $t$ outside of the tank. The lighter matters, which gravitate through the pipe $b$ from the tank or first separator, B, are discharged into the compartment $a'$. The valves $u\ u$ in the outlet-pipes $t\ t'$ being closed, as the compartment $a'$ fills the matter will overflow into the other compartment, and, entering the outlet-pipe $s$, will rise simultaneously to the same height and flow over into the pipe $t$, from whence it may be discharged at any desired point. In the upper part of the tank is provided another outlet-pipe, $w$, having a gate-valve, $x$. While the tank is filling the lightest matter floating on the surface of the fluid at and above this outlet may be discharged into a suitable receptacle by opening the valve $x$.

In my system of sewerage two or more of the described tanks may be employed, as may be found necessary, and such tanks may vary in their relation to each other, either being all placed underground, or, as in the present instance, where the sewage is to be discharged at an elevated point the separators may be placed above ground.

In order to provide for the discharge of sewage directly from the receiving-tank A on the plane of the ordinary grade-sewer, I connect therewith an auxiliary outlet-pipe, $y$, having a gate-valve, $z$, through which the entire contents of the tank may be drawn out by means of a suction-pump or otherwise.

In carrying out my process the operation is as follows: The sewage or other matter flows or gravitates through the pipe $a$ and fills the receptacle A, (the caps $k$ from the sewer-pipe and air-relief pipe $d$ having been removed by operating the piston $m$.) If the receiving-tank is located at a point remote from the house or engine room, I provide a float, $e'$, which rises when the tank is filled and closes an electric circuit or other device, thereby signaling the engineer, who at once closes the mouth of the sewer-pipe. The mouths of the sewer-pipe $a$ and air-pipe $d$ being then closed, compressed air is admitted through pipe $e$, which expels the sewage from the tank A through the elevated pipe $b$ (the gate-valves in pipes $f$, $y$, and $i$ of course being closed) and thence on into the tank B. Here the solid or heavier matter, which descends to the bottom, may be discharged by opening the valve $q$. The lighter matter—that which passes through the sieve $g'$—discharges through the pipe $c$ and thence on by pipe $b$ into the third tank, C, where a further separation is effected. Here the heavier matter will be expelled by pipe $s$ into the pipe $t$ to its final destination, while if the valve $x$ be opened the lighter or oily floating matter can be drawn off into a receptacle or be conveyed away separately to some suitable point of discharge.

By introducing air into the tank A through the pipe $h$ the mass may be kept in a state of agitation. If desired, however, the solid matter may be allowed to settle at the bottom of the tank and a separation of the mass be effected, when the fluid or lighter matters can be expelled through the pipe $f$ into the main pipe $b$ and on into either one or both of the tanks B and C, as may be desired.

In order to permit of the discharge of the matter that settles in the tank B into a receptacle or cart for transportation without exposure to the atmosphere, I provide on the funnel-shaped neck or aperture of the said tank a similarly-shaped sleeve, $l'$, which can be moved up and down thereon to form an extension of the neck or discharge-aperture. On each side of the sleeve is connected one end of an upright arm, $r'$, which arms have a pin-and-slot connection with curved arms $n'$, which are pivoted at their inner ends to each other and to a short arm, $v'$, which has a pin-and-slot connection with the lever $o'$, to which the gate-valve $q$ is connected. Lifting the lever $o'$ will open the gate-valve $q$ and at the same time drop the sleeve $l'$, thereby lengthening the outlet or discharge orifice sufficiently to permit it to enter and open into any receiving-vessel placed beneath it.

In carrying out my system of sewerage it may be become desirable to utilize the lighter products for fertilization to a greater or less degree, and to accomplish this by such means as can be controlled by the farmer on his own premises I connect at any given point on the line of the pipe $b$ or the general discharge-pipe a pipe, E, which extends down beneath the ground, and which at any one or more points, as desirable, is provided with short pipes F, which open above the ground and are arranged to receive a hose or pump for discharging the matter, the flow being regulated by a valve, G. The main pipe may be tapped at any number of points on its line that may be desired, so that as the products are being discharged from the main receiving-tank they may be drawn off through the connected branches at any time.

What I claim as new, and desire to secure by Letters Patent, is—

1. The method of collecting and disposing of sewage from low plains, which consists in collecting the sewage in a closed tank, agitating the same by means of jets or currents of air, and then expelling the mass at a given elevation above the ground by the introduction of compressed air in the tank, as set forth.

2. The combination, with an ordinary grade-sewer, of a closed receiver provided with an outlet-pipe extending above the ground to a height to attain a gravity flow, an air-relief pipe opening in the interior of said tank on a plane with the sewer, and self-acting caps closing the mouths of the sewer and air-relief pipe with an air-compressing main, as set forth.

3. The combination, with a closed receiver communicating with the sewer and provided with an elevated outlet-pipe, compressed-air pipe, and means for regulating the admission of sewage into said receiver, of a secondary closed tank communicating with the outlet-pipe, divided by a perforated diaphragm or grating, and provided with a discharge-orifice in the bottom, and an outlet-pipe whereby the separation and discharge of the solid and fluid matters are effected, as described.

4. The combination, with a closed receptacle adapted to receive and discharge the sewage from an ordinary grade-sewer, of a tank communicating with said discharge-pipe, provided with a drainer or grating to separate the liquid from the solid matter, and ducts for the discharge of such matters, as and for the purpose set forth.

5. The combination, with a sewage-tank connected with a sewer-pipe, of a funnel-shaped opening and valve located in the bottom of said tank, a grating arranged within the tank, and a duct or opening above said grating communicating with another tank, whereby the lighter matter is separated and conveyed into another tank, as set forth.

6. In combination with the tank A, the tanks B and C, arranged to receive the delivery from said tank, with means for separating the solid from the fluid matter, and conduits for conveying the liquid to the final point of discharge, as set forth.

7. The combination, with the sewer-pipe $a$, of the receiver A, provided with the outlet-pipe $b$, air-relief pipe $d$, compressed-air pipe $e$, self-acting caps $k$, for closing the mouth of the sewer-pipe and air-relief pipe, and discharge-pipe $f$, having valve $g$, as and for the purpose set forth.

8. The separator C, divided into two compartments arranged to receive the delivery from the tank A by gravitation, and provided with an overflow, and a discharge-duct, as and for the purpose set forth.

9. The combination, with the tank B, having a funnel-shaped discharge or outlet, of the funnel-shaped sleeve $l'$, with arms $r'$ and $n'$, having a pin-and-slot connection, and arm $v'$ and lever $o'$, having a similar connection with gate-valve $q$, as set forth.

10. The combination, with a receiving-tank and its main discharge-pipe, of the connecting-pipe E, extending beneath the ground with branch connection F, and valve G, as and for the purpose set forth.

WILLIAM A. PITT.

Witnesses:
K. NEWELL,
HERMANN G. LOEW.